(12) United States Patent
Mehrabian et al.

(10) Patent No.: US 9,909,374 B2
(45) Date of Patent: Mar. 6, 2018

(54) MANAGED PRESSURE DRILLING WITH HYDRAULIC MODELING THAT INCORPORATES AN INVERSE MODEL

(71) Applicant: Halliburton Energy Services, Inc., Houston, TX (US)

(72) Inventors: Amin Mehrabian, Houston, TX (US); Sorin Gabriel Teodorescu, The Woodlands, TX (US); Dale E. Jamison, Humble, TX (US)

(73) Assignee: HALLIBURTON ENERGY SERVICES, INC., Houston, TX (US)

( * ) Notice: Subject to any disclaimer, the term of this patent is extended or adjusted under 35 U.S.C. 154(b) by 132 days.

(21) Appl. No.: 14/898,379

(22) PCT Filed: Mar. 3, 2015

(86) PCT No.: PCT/US2015/018407
§ 371 (c)(1),
(2) Date: Dec. 14, 2015

(87) PCT Pub. No.: WO2016/140650
PCT Pub. Date: Sep. 9, 2016

(65) Prior Publication Data
US 2016/0376859 A1 Dec. 29, 2016

(51) Int. Cl.
*G06G 7/48* (2006.01)
*E21B 21/08* (2006.01)
(Continued)

(52) U.S. Cl.
CPC ............ *E21B 21/08* (2013.01); *E21B 21/106* (2013.01); *E21B 34/02* (2013.01);
(Continued)

(58) Field of Classification Search
CPC ...... E21B 21/08; E21B 34/02; E21B 41/0092; E21B 47/065; E21B 21/106; E21B 47/06; E21B 44/00; G05B 13/048
(Continued)

(56) References Cited

U.S. PATENT DOCUMENTS 8,240,398 B2    8/2012  Lovorn et al.
8,281,875 B2   10/2012  Lovorn et al.
(Continued)

FOREIGN PATENT DOCUMENTS

WO     2013081775 A1    6/2013

OTHER PUBLICATIONS

International Search Report and Written Opinion for PCT/US2015/018407 dated Nov. 16, 2015.

*Primary Examiner* — Saif Alhija
(74) *Attorney, Agent, or Firm* — McDermott Will & Emery LLP

(57) ABSTRACT

A managed pressure drilling (MPD) operation may use an inverse model in conjunction with a hydraulic model and real-time drilling conditions and parameters as inputs to determine a wellhead pressure set point corresponding to a desired bottomhole pressure. For example, while drilling a wellbore penetrating a subterranean formation with a drilling system, measured data including a wellhead pressure may be acquired. A model may then be executed that applies a hydraulic model to an a priori model estimate vector to produce predicted data; converts the measured data to a measured data vector; applies a randomized maximum likelihood algorithm to the a priori model estimate vector, the predicted data, and the measured data vector to produce an a posterioiri model estimates; and applies the hydraulic model to the a posterioiri model estimates to produce an a (Continued)

posteriori prediction and a calculated wellhead pressure set point corresponding to a desired bottomhole pressure.

12 Claims, 2 Drawing Sheets

(51) Int. Cl.
    *E21B 44/00*     (2006.01)
    *E21B 47/06*     (2012.01)
    *E21B 21/10*     (2006.01)
    *E21B 34/02*     (2006.01)
    *E21B 41/00*     (2006.01)
    *G05B 13/04*     (2006.01)

(52) U.S. Cl.
    CPC .......... *E21B 41/0092* (2013.01); *E21B 44/00* (2013.01); *E21B 47/06* (2013.01); *E21B 47/065* (2013.01); *G05B 13/048* (2013.01)

(58) Field of Classification Search
    USPC .................................................. 703/2, 9, 10
    See application file for complete search history.

(56) References Cited

U.S. PATENT DOCUMENTS

| | | |
|---|---|---|
| 8,833,488 B2 | 9/2014 | Knudsen et al. |
| 2008/0210470 A1 | 9/2008 | Stewart |
| 2012/0165997 A1 | 6/2012 | Lewis et al. |
| 2012/0292106 A1 | 11/2012 | Orbell et al. |
| 2013/0118749 A1 | 5/2013 | Hannegan et al. |
| 2014/0144225 A1 | 5/2014 | Johnson et al. |

# MANAGED PRESSURE DRILLING WITH HYDRAULIC MODELING THAT INCORPORATES AN INVERSE MODEL

BACKGROUND

The present disclosure relates to managed pressure drilling (MPD) operations.

MPD operations are well known as the art of precisely controlling bottomhole pressure during drilling by utilizing a closed annulus and a means for regulating pressure in the annulus. The annulus is typically closed during drilling through use of a rotating control device (RCD, also known as a rotating control head or rotating blowout preventer) which seals about the drill pipe as it rotates.

The means for regulating pressure in the annulus can include a choke interconnected in the mud return line and, in some applications, a backpressure pump to apply pressure to the annulus while connections are made in the drill pipe string. Unfortunately, use of a backpressure pump requires substantial capital investment, the additional pump takes up scarce space on offshore rigs, the pump output is difficult to control accurately, and use of the pump interferes with normal operations on a drilling rig.

BRIEF DESCRIPTION OF THE DRAWINGS

The following figures are included to illustrate certain aspects of the embodiments, and should not be viewed as exclusive embodiments. The subject matter disclosed is capable of considerable modifications, alterations, combinations, and equivalents in form and function, as will occur to those skilled in the art and having the benefit of this disclosure.

DETAILED DESCRIPTION

The present disclosure relates to MPD operations. More specifically, the present disclosure describes MPD operations using an inverse model in conjunction with a hydraulic model and real-time measurements of drilling conditions and parameters as inputs to determine a wellhead pressure set point that provides a desired bottomhole pressure. The inverse model refines the hydraulic model input by incorporating random sampling of the model parameter with mean and standard deviation as well as a probability function distribution (pdf) of data measurements. Further, it includes a nonlinear optimization algorithm to adjust for the model parameters in order to honor the data measurements.

Figure 1:
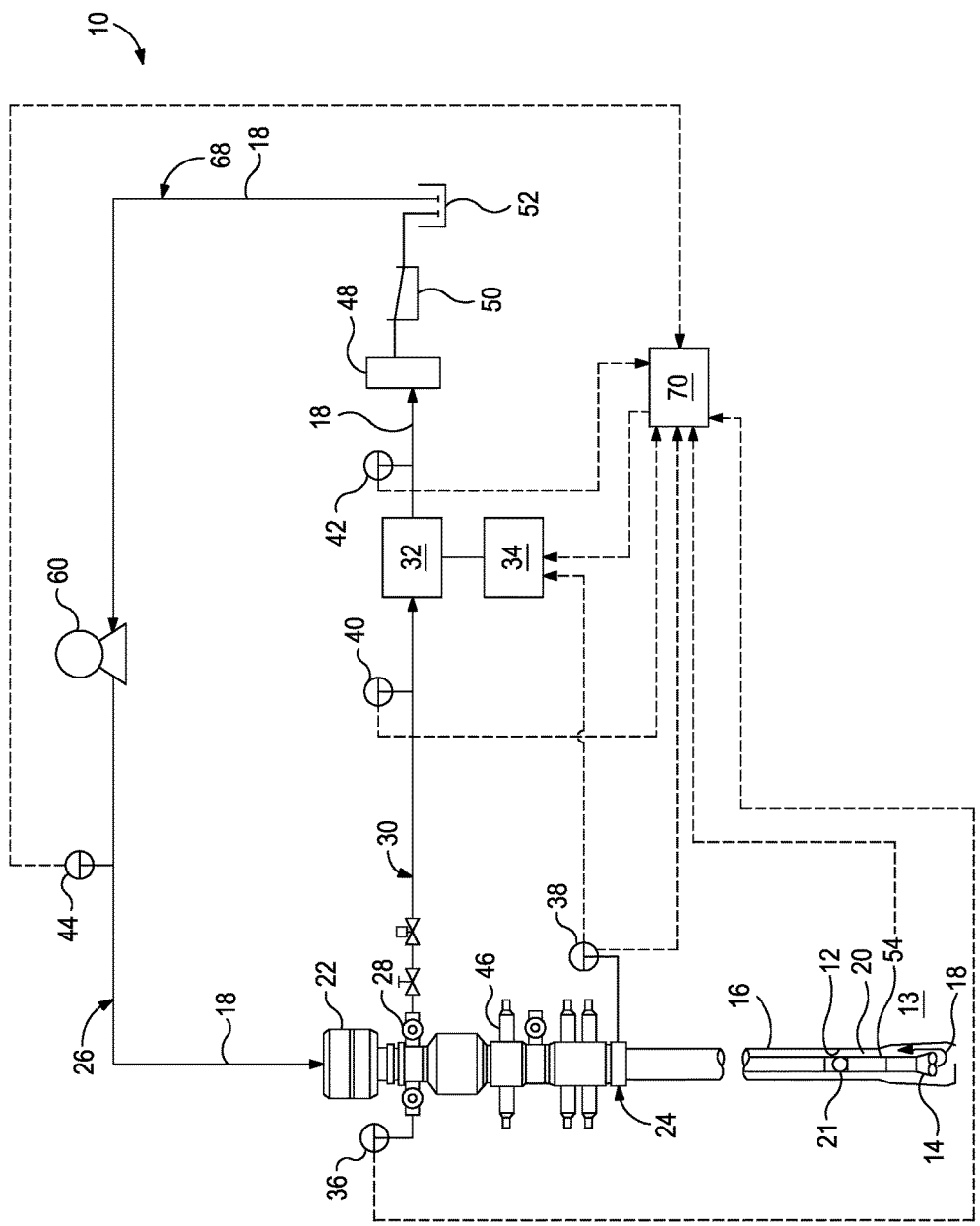
FIG. 1 provides an illustrative diagram of a drilling system and associated method according to at least some embodiments described herein.

FIG. 1 is an illustrative diagram of a drilling system 10 and associated method according to at least some embodiments described herein. In the system 10, a wellbore 12 penetrating a subterranean formation 13 is drilled by rotating a drill bit 14 on an end of a drill string 16. A drilling fluid 18, also referred to as a mud, is circulated downward through the drill string 16, out the drill bit 14, and upward through an annulus 20 defined by the drill string 16 and the wellbore 12. The drilling fluid 18 may serve to cool the drill bit 14, lubricate the drill string 16, and remove cuttings from the wellbore 12. A non-return valve 21 (e.g., a flapper-type check valve) may be used to prevent flow of the drilling fluid 18 upward through the drill string 16 (e.g., when connections are being made in the drill string).

Control of bottomhole pressure is very important in MPD operations, as well as in other types of drilling operations. For example, the bottomhole pressure is controlled to prevent excessive loss of fluid into the formation 13 surrounding the wellbore 12 and/or undesired fracturing of the formation, which may occur with too high a bottomhole pressure, and undesired influx of formation fluids into the wellbore 12, which may occur with too low a bottomhole pressure. In typical MPD operations, the bottomhole pressure is kept just greater than a pore pressure of the formation 13, without exceeding a fracture pressure of the formation 13. In typical underbalanced drilling, the bottomhole pressure is kept somewhat less than the pore pressure, thereby obtaining a controlled influx of fluid from the formation 13.

In the illustrated system 10, the bottomhole pressure may be controlled, at least in part, by closing off the annulus 20 (e.g., isolating it from communication with the atmosphere and enabling the annulus 20 to be pressurized at or near the surface) using a rotating control device 22 (RCD). The RCD 22 seals about the drill string 16 above a wellhead 24. Although not shown in FIG. 1, the drill string 16 generally extends upwardly through the RCD 22 for connection to, for example, a rotary table (not shown), a standpipe line 26, kelley (not shown), a top drive and/or other conventional drilling equipment.

The drilling fluid 18 exits the wellhead 24 via a wing valve 28 in communication with the annulus 20 below the RCD 22. The fluid 18 then flows through mud return lines 30, 73 to a choke manifold 32. Backpressure is applied to the annulus 20 by variably restricting flow of the fluid 18 through the choke(s) of the choke manifold 32. The greater the restriction to flow through the chokes, the greater the backpressure applied to the annulus 20. Thus, bottomhole pressure can be regulated by varying the backpressure applied to the annulus 20, also referred to as the wellhead pressure set point. The models described herein combine an inverse model with a hydraulic model, as described more fully below, and may be included on a control system 70 for determining a calculated wellhead pressure set point to produce a desired bottomhole pressure. A choke controller 34 for the choke manifold 32 may be operated based at least in part on the calculated wellhead pressure set point.

The drilling fluid 18 leaving the choke manifold 32 may be conveyed to a separator 48, a shaker 50, and then a mud pit 52 via flow line 56. After the mud pit 52, a flow control device 60 (e.g., a high pressure pump) may be used to convey the drilling fluid 18 in flow line 68 to the standpipe line 26.

The drilling system 10 includes a plurality of sensors 36, 38, 40, 42, 44 at various locations. The sensors 36, 38, 40, 42, 44 at each of the various locations in the drilling system 10 may be suitable for measuring pressure, temperature, fluid flow rate (two-phase or one-phase, depending on location), or a combination thereof.

The sensors 36, 38, 40 are illustrated at or near the surface, where the sensors 36 are below the RCD 22 and above a blowout preventer (BOP) stack 46, the sensors 38 are in the wellhead 24 below the BOP stack 46, and the sensors 40 are along the return line 30 upstream of the choke manifold 32. The sensors 44 are in the standpipe line 26 upstream of the drill string 16. Finally, the sensors 42 are downstream of the choke manifold 32 and upstream of the separator 48, the shaker 50, and the mud pit 52.

In addition to the sensors 36, 38, 40, 42, 44 outside the wellbore 12, the drill string 16 may include sensors 54, for example, to directly measure bottom hole pressure. Such sensors 54 may be of the type known to those skilled in the art as pressure while drilling (PWD), measurement while drilling (MWD) and/or logging while drilling (LWD). These drill string sensor systems generally provide at least pressure measurement, and may also provide temperature measurement, detection of drill string characteristics (such as vibration, weight on bit, stick-slip, etc.), formation characteristics (such as resistivity, density, etc.) and/or other measurements. Various forms of telemetry (acoustic, pressure pulse, electromagnetic, etc.) may be used to transmit the downhole sensor measurements to the surface.

The sensors 36, 38, 40, 42, 44, 54 are illustrated as communicably coupled to the control system 70, where the control system 70 may use the data received from the sensors 36, 38, 40, 42, 44, 54 in the models described herein.

Further, at least one pressure sensor measuring actual wellhead pressure and located at the sensors 38 communicated with the choke controller 34. The choke controller 34 may use the measured wellhead pressure and the calculated wellhead pressure set point, and/or a comparison of the two, from the models described herein to adjust the flow of the fluid 18 through the choke(s) of the choke manifold 32 in order to achieve the desired bottomhole pressure.

While the control system 70 and the choke controller 34 are illustrated as separate components, in alternate embodiments, a single control system may be used that performs the function of both the control system 70 and the choke controller 34. Additionally, while each of the control system 70 and the choke controller 34 is illustrated as an individual component, each may alternatively be several components that together perform the same function as the control system 70 or the choke controller 34.

Control systems (e.g., control system 70 and the choke controller 34 of FIG. 1) and corresponding computer hardware used to implement the various illustrative blocks, modules, elements, components, methods, and algorithms described herein can include a processor configured to execute one or more sequences of instructions, programming stances, or code stored on a non-transitory, computer-readable medium. The processor can be, for example, a general purpose microprocessor, a microcontroller, a digital signal processor, an application specific integrated circuit, a field programmable gate array, a programmable logic device, a controller, a state machine, a gated logic, discrete hardware components, an artificial neural network, or any like suitable entity that can perform calculations or other manipulations of data. In some embodiments, computer hardware can further include elements such as, for example, a memory (e.g., random access memory (RAM), flash memory, read only memory (ROM), programmable read only memory (PROM), erasable read only memory (EPROM)), registers, hard disks, removable disks, CD-ROMs, DVDs, or any other like suitable storage device or medium.

Executable sequences described herein can be implemented with one or more sequences of code contained in a memory. In some embodiments, such code can be read into the memory from another machine-readable medium. Execution of the sequences of instructions contained in the memory can cause a processor to perform the process steps described herein. One or more processors in a multi-processing arrangement can also be employed to execute instruction sequences in the memory. In addition, hard-wired circuitry can be used in place of or in combination with software instructions to implement various embodiments described herein. Thus, the present embodiments are not limited to any specific combination of hardware and/or software.

As used herein, a machine-readable medium will refer to any medium that directly or indirectly provides instructions to a processor for execution. A machine-readable medium can take on many forms including, for example, non-volatile media, volatile media, and transmission media. Non-volatile media can include, for example, optical and magnetic disks. Volatile media can include, for example, dynamic memory. Transmission media can include, for example, coaxial cables, wire, fiber optics, and wires that form a bus. Common forms of machine-readable media can include, for example, floppy disks, flexible disks, hard disks, magnetic tapes, other like magnetic media, CD-ROMs, DVDs, other like optical media, punch cards, paper tapes and like physical media with patterned holes, RAM, ROM, PROM, EPROM and flash EPROM.

Figure 2:
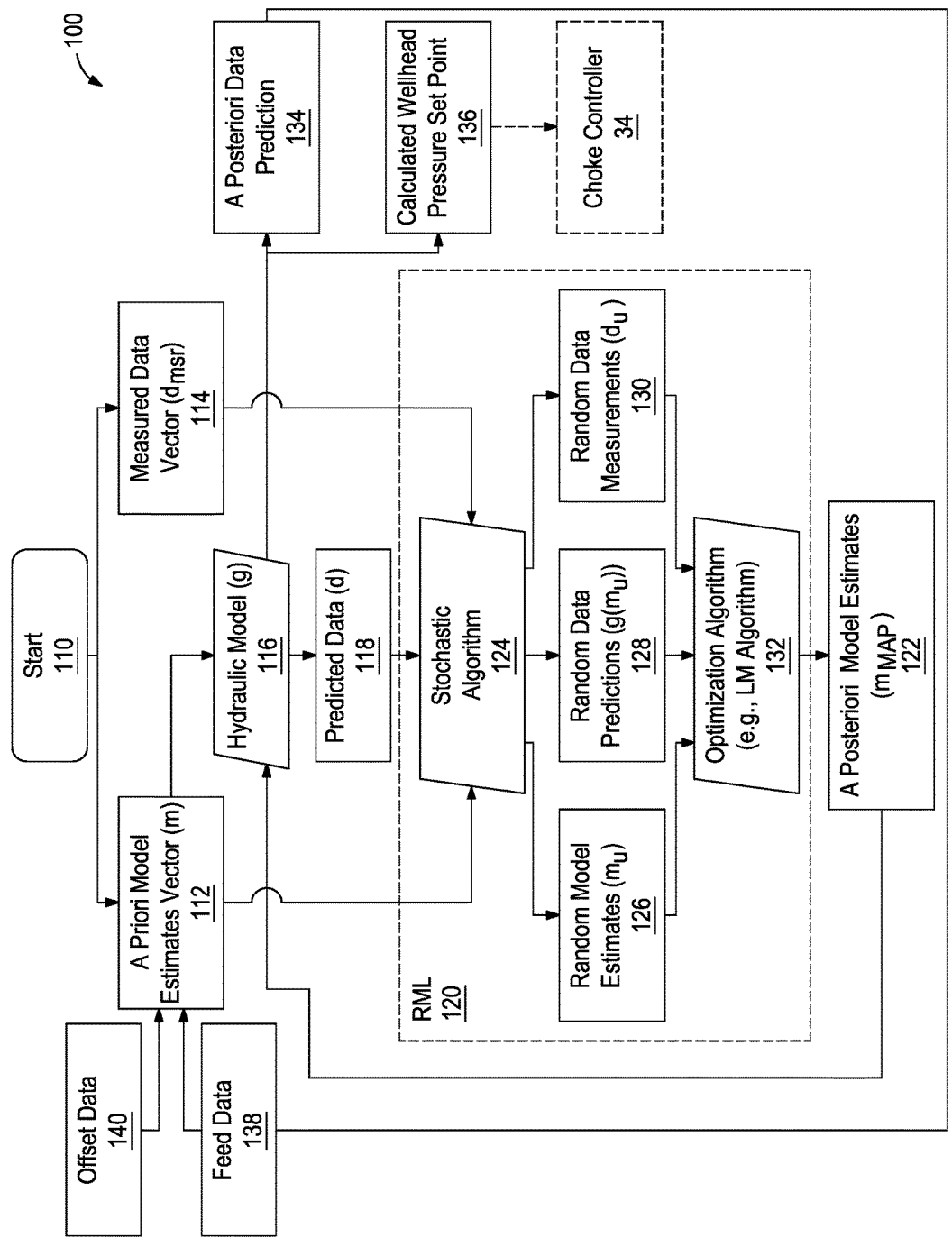
FIG. 2 is a diagram of a model described herein that uses an inverse model in conjunction with a hydraulic model.

FIG. 2 is a diagram of a model 100 described herein that uses an inverse model in conjunction with a hydraulic model. Upon initiation or start 110 of the model 100 an a priori model estimates vector 112 (m) is determined, and a measured data vector 114 ($d_{msr}$) is tabulated based on the collected data. The a priori model estimates vector 112 is entered into a hydraulic model 116 (g) functions to produce predicted data 118 (d). The predicted data 118 may or may not be close in value to the measured data vector 114.

The a priori model estimates vector 112 and the measured data vector 114 together with the output of the hydraulic model 116 (the predicted data 118) are used as input to a randomized maximum likelihood (RML) algorithm 120, which outputs a posterioiri model estimates 122 ($m_{MAP}$). The RML algorithm 120 aims to quantify the uncertainties in predictions of the model parameters associated with inaccuracies in real data measurements. While FIG. 2 provides modules and algorithms for the RML algorithm 120, in alternate embodiments, the specific RML algorithm 120 described may be replaced with other stochastic optimization algorithms.

In the illustrated RML algorithm 120, first the various input (e.g., the a priori model estimates vector 112, the measured data vector 114, and the predicted data 118) are converted with a stochastic algorithm 124 to random model estimates 126 ($m_u$), random data predictions 128 ($g(m_u)$), and random data measurements 130 ($d_u$), respectively. Generally, the stochastic algorithm 124 artificially converts the numbers of each data set into a distribution of stochastic numbers. The three stochastic distributions are then input into an optimization algorithm 132 (e.g., a Levenberg-Marquardt algorithm), which outputs the a posteriori model estimates 122.

The a posteriori model estimates 122 are then entered into the hydraulic model 116 to produce an a posteriori data prediction 134 output and a calculated wellhead pressure set point output 136 for a desired bottomhole pressure. The a posteriori data prediction 134 output is more accurate than the predicted data 118 produced from the first pass through the hydraulic model 116.

The a posteriori data prediction 134 may be feedback into the model 100 as feed data 138 to improve accuracy of the a priori model estimates vector 112. The feed data 138 is data from the methods described herein at the well currently being drilled at a previous time and depth. Additionally, in some instances, offset data 140 may be used as input to the a priori model estimates vector 112 to improve accuracy.

The offset data 140 includes data from a drilling operation in an offset well at the same measured depth and formation conditions.

The a priori model estimates vector 112 is an M-dimensional random column vector of parameters of the model that cannot be found deterministically (i.e., cannot be defined or measured accurately). Examples of such parameters may include, but are not limited to, drilling fluid rheology properties (e.g., mud compressibility and viscosity) at bottomhole conditions, the thermal expansion coefficients of the drilling fluid, liquid gas ratio (LGR) in the drilling fluid when surface two-phase flow measurements are not available, the size to mass ratio of the cuttings, the bottomhole geometry of the wellbore, and the cuttings bed height. In some instances, the a priori model estimates vector 112 may be determined prior to the drilling operation. For example, a drilling model or drilling simulation may be used to build the parameters of the drilling operation and produce the a priori model estimates vector 112. In some instances, offset data 140 may be useful as an input to the drilling model to produce a more accurate a priori model estimates vector 112.

The measured data vector 114 is the data vector of real measurements from the various sensors 36, 38, 40, 42, 44, 54 in the drilling system 10 of FIG. 1. The measured data vector 114 may be represented by Equation 1, wherein $PWD_i$ is pressure while drilling measurements from the sensors 54 along the drill string 16, $T_i$ is the temperature, $Q_{TP}$ is the two-phase flow rate upstream of the separator 48 or degasser, and $Q_m$ is the single-phase mud flow downstream of the separator 48.

$$d_{msr} = [PWD_i, T_i, Q_{TP}, Q_m, \ldots]$$ Equation 1

The sensor errors can be quantified with random Gaussian distribution of a mean and covariance matrix ($C_D$). Alternatively, $m_{prior}$ is a random vector with the mean of a reasonable prior estimate to the selected model parameters (subjected to fine-tuning) and covariance ($C_M$).

The predicted data vector 118 is d=g(m). Generally, g(m) is a set of analytical functions of model variables from which the data are predicted through the solution to the hydraulic model. More specifically, g(m) is an N-dimensional column vector of predicted values for bottomhole MWD measurements.

The stochastic algorithm 124 (e.g., an a posterior probability distribution function (pdf)) of the model, conditioned by measured data ($f(m|d_{msr})$), can then be represented by Equation 2, where O(m) is represented by Equation 3.

$$f(m|d_{msr}) = a\exp[-O(m)]$$ Equation 2

$$O(m) = -\frac{1}{2}(m - m_{prior})^T C_M^{-1}(m - m_{prior}) - \frac{1}{2}(g(m) - d_{msr})^T C_D^{-1}(g(m) - d_{msr})$$ Equation 3

As the maximum value for the a posterioiri model estimates 122 ($m_{MAP}$) are generally desired, in Equation 1 the $f(m_{MAP}|d_{msr})$ is maximized, or, equivalently, the O(m) is minimized.

The randomized maximum likelihood RML algorithm 120 is applied to the $f(m|d_{msr})$.

The RML algorithm 120 illustrated in FIG. 2 generates a set of approximate posterior pdf for the a posteriori model estimates 122. For this purpose, $N_S$ realizations of the random model estimates ($m_{uc,i}$) with a Gaussian distribution of the mean $m_{i,prior}$ and covariance $C_M$, along with $N_S$ Gaussian samples of random data measurements ($d_{uc,i}$) are generated. The mean and covariance matrix of $d_{uc,i}$ and $m_{uc,i}$ would be respectively equal to $d_{msr}$ and $C_D$. By substitution of $d_{msr}$ with and $d_{uc,i}$ and $m_{i,prior}$ with $m_{uc,i}$, $m_{MAP,i}$ (i.e., the model vector which minimizes the objective function) is derived and defined in Equation 3 above. A modified version of the standard Levenberg-Marquardt (LM algorithm) can be used for this purpose.

Realizations of model and data samples are found from Equations 4 and 5, where, L stands for Cholskey decomposition of its corresponding covariance matrix. $X_i$ and $Y_i$ are random vector realizations from a Gaussian distribution of mean μ=1 and variance σ=1.

$$m_{u,i} = m_{prior} + L_M \cdot X_i$$ Equation 4

$$d_{u,i} = d_{msr} + L_D \cdot Y_i$$ Equation 5

The LM algorithm for calculating the MAP estimate of model parameters can be written as Equation 6, where, l is the iteration number and $I_M$ is an M×M identity matrix, $\lambda_l$ is the LM parameter, $H_l$ is the Gauss-Newton Hessian matrix which is written as Equation 7, and G is the sensitivity matrix and is defined by Equation 8.

$$(H_l + \lambda_l I_M)\delta m^l = -C_M^{-1}(m^l - m_u) + G_l^T C_D^{-1}[g(m^l) - d_u]$$ Equation 6

$$H_l = C_M^{-1} + G_l^T C_D^{-1} G_l$$ Equation 7

$$G = \begin{bmatrix} (\nabla_m g_1)^T \\ (\nabla_m g_2)^T \\ (\nabla_m g_3)^T \end{bmatrix} = (\nabla_m g^T)^T$$ Equation 8

Because of the extensive number of algebraic terms and the nonlinearities involved with the model function, numerical derivation techniques can be used to calculate the sensitivity matrix $G_l$ at each iteration. If the objective function $(m^{l+1}) = O(m^l)$, then the next iteration is undertaken with a new model vector $m^{l+1} = m^l + \delta m^l$ and $$\lambda^{l+1} = \frac{\lambda^l}{10}.$$

Otherwise, the correction to $m^l$ is discarded and iteration is repeated with $\lambda^{l+1} = 10\lambda^l$. Iterations are continued until convergence is acquired to produce the a posterioiri model estimates 122, which as described above may be input into the hydraulic model 116 to produce the a posterioiri data prediction 134 and the calculated wellhead pressure set point 136. The a posterioiri data prediction 134, like the predicted data 118, includes predicted data or values for the drilling conditions (e.g., bottomhole temperature, bottomhole pressure, pressure while drilling values corresponding to the sensors 54 along the drill string 16, the two-phase flow rate upstream of the separator 48 or degasser, and the single-phase mud flow downstream of the separator 48). The calculated wellhead pressure set point 136 that corresponds to a desired bottomhole pressure is another output of the hydraulic model 116. The calculated wellhead pressure set point 136 may then be transmitted to the choke controller 34, which may adjust the fluid flow through the choke to adjust the actual wellhead pressure set point to the desired and/or calculated wellhead pressure set point 136 so as to achieve the desired bottomhole pressure.

In some embodiments, the data collected using the models described is archived. Evaluation of job performance can then be assessed and improved for future operations or such information can be used to design subsequent operations. In addition, the data and information can be communicated (wired or wirelessly) to a remote location by a communication system (e.g., satellite communication or wide area network communication) for further analysis. The communication system can also allow remote monitoring and operation of a chemical reaction process to take place. Automated control with a long-range communication system can further facilitate the performance of remote job operations. In particular, an artificial neural network can be used in some embodiments to facilitate the performance of remote job operations. That is, remote job operations can be conducted automatically in some embodiments. In other embodiments, however, remote job operations can occur under direct operator control, where the operator is not at the job site (e.g., via wireless technology).

Embodiments disclosed herein include Embodiment A, Embodiment B, and Embodiment C.

Embodiment A is a method that includes (1) drilling a wellbore penetrating a subterranean formation with a drilling system; (2) acquiring measured data from the drilling system, the measured data including a wellhead pressure of the drilling system; (3) executing a model that includes: applying a hydraulic model to an a priori model estimate vector to produce predicted data; converting the measured data to a measured data vector; applying a randomized maximum likelihood algorithm to the a priori model estimate vector, the predicted data, and the measured data vector to produce an a posterioiri model estimates; and applying the hydraulic model to the a posterioiri model estimates to produce an a posteriori prediction and a calculated wellhead pressure set point that corresponds to a desired bottomhole pressure; (4) changing a wellhead pressure set point based on the calculated wellhead pressure set point.

Embodiment A may have one or more of the following additional elements in any combination: Element A1: wherein applying the randomized maximum likelihood algorithm to the a priori model estimate vector, the predicted data, and the measured data vector to produce the a posterioiri model estimates involves: applying a stochastic algorithm to the a priori model estimate vector, the predicted data, and the measured data vector to produce random model estimates, random data predictions, and random data measurements, respectively; and applying an optimization algorithm to the random model estimates, the random data predictions, and the random data measurements to produce the a posterioiri model estimates; Element A2: wherein the measured data further comprises one selected from the group consisting of: a pressure of the drilling fluid downstream of a wellhead of the drilling system and upstream of a choke manifold of the drilling system, a pressure of the drilling fluid downstream of the choke manifold and upstream of a separator of the drilling system, a pressure of the drilling fluid downstream of a pump of the drilling system and upstream of the wellhead, a pressure of the drilling fluid in the wellbore, a temperature of the drilling fluid at the wellhead, a temperature of the drilling fluid downstream of the wellhead and upstream of the choke manifold, a temperature of the drilling fluid downstream of the choke manifold and upstream of the separator, a temperature of the drilling fluid downstream of the pump and upstream of the wellhead, a temperature of the drilling fluid in the wellbore, a flow rate of the drilling fluid at the wellhead, a two-phase flow rate of the drilling fluid downstream of the wellhead and upstream of the choke manifold, a two-phase flow rate of the drilling fluid downstream of the choke manifold and upstream of the separator, a flow rate of the drilling fluid downstream of the pump and upstream of the wellhead, a flow rate of the drilling fluid in the wellbore, and any combination thereof; Element A3: the method further including deriving the a priori model estimates vector with offset data as at least one input; Element A4: the method further including converting the a posteriori prediction to feed data; and deriving the a priori model estimates vector with the feed data as at least one input; Element A5: the method further including running a drilling simulation to produce the a priori model estimates vector; and Element A6: the method further including running a drilling simulation with offset data as at least one input to produce the a priori model estimates vector. By way of non-limiting example, exemplary combinations applicable to Embodiment A include: Element A1 in combination with Element A2; Elements A1, A2, or both in combination with one or more of Elements A3-A6; and two or more of Elements A3-A6 in combination.

Embodiment B is a drilling system that includes (1) a wellhead operably coupled to a drill string extending into a wellbore; (2) a drill bit attached to the distal end of the drill string; (3) a pump operably connected to the drill string for circulating the drilling fluid through the drill string to an annulus defined by the drill string and the wellbore to the wellhead and a choke manifold; (4) a pressure sensor at the wellhead to measure a wellhead pressure; (5) a first control system that includes a first non-transitory, tangible, computer-readable storage medium: containing a first program of instructions that cause a first computer system running the first program of instructions to: receive measured data from the pressure sensor; receive or store an a priori model estimates vector; apply a hydraulic model to the a priori model estimate vector to produce predicted data; convert the measured data to a measured data vector; apply a randomized maximum likelihood algorithm to the a priori model estimate vector, the predicted data, and the measured data vector to produce an a posterioiri model estimates; and apply the hydraulic model to the a posterioiri model estimates to produce a calculated wellhead pressure set point; and (6) a second control system communicably coupled to the first control system to receive the calculated wellhead pressure set point and that includes a second non-transitory, tangible, computer-readable storage medium: containing a second program of instructions that cause a second computer system running the second program of instructions to: manipulate the choke manifold based on the a posteriori prediction. Embodiment B may have one or more of the following additional elements in combination: Element B1: wherein apply a randomized maximum likelihood algorithm to the a priori model estimate vector, the predicted data, and the measured data vector to produce an a posterioiri model estimates causes the first computer system running the first program of instructions to: apply a stochastic algorithm to the a priori model estimate vector, the predicted data, and the measured data vector to produce random model estimates, random data predictions, and random data measurements, respectively; and apply an optimization algorithm to the random model estimates, the random data predictions, and the random data measurements to produce the a posterioiri model estimates; and Element B2: a separator downstream of the choke manifold; and at least one sensor configured and located to measure at least one selected from the group consisting of: a pressure of the drilling fluid downstream of the wellhead and upstream of the choke manifold, a pressure of the drilling fluid downstream of the choke manifold and upstream of the separator, a pressure of the drilling fluid downstream of the pump and upstream of the wellhead, a pressure of the drilling fluid in the wellbore, a temperature of the drilling fluid at the wellhead, a temperature of the drilling fluid downstream of the wellhead and upstream of the choke manifold, a temperature of the drilling fluid downstream of the choke manifold and upstream of the separator, a temperature of the drilling fluid downstream of the pump and upstream of the wellhead, a temperature of the drilling fluid in the wellbore, a flow rate of the drilling fluid at the wellhead, a flow rate of the drilling fluid downstream of the wellhead and upstream of the choke manifold, a flow rate of the drilling fluid downstream of the choke manifold and upstream of the separator, a flow rate of the drilling fluid downstream of the pump and upstream of the wellhead, a flow rate of the drilling fluid in the wellbore, and any combination thereof Embodiment C is a non-transitory, tangible, computer-readable storage medium: containing a program of instructions that cause a computer system running the program of instructions to: receive measured data from a plurality of sensors coupled to a drilling assembly, the sensors configured to measure one selected from the group consisting of a pressure, a temperature, a drilling fluid flow rate, and a combination thereof; receive or store an a priori model estimates vector; apply a hydraulic model to the a priori model estimate vector to produce predicted data; convert the measured data to a measured data vector; apply a randomized maximum likelihood algorithm to the a priori model estimate vector, the predicted data, and the measured data vector to produce an a posterioiri model estimates; and apply the hydraulic model to the a posterioiri model estimates to produce a calculated wellhead pressure set point.

Embodiment C may optionally further include Element C1: wherein apply a randomized maximum likelihood algorithm to the a priori model estimate vector, the predicted data, and the measured data vector to produce an a posterioiri model estimates causes the computer system running the program of instructions to: apply a stochastic algorithm to the a priori model estimate vector, the predicted data, and the measured data vector to produce random model estimates, random data predictions, and random data measurements, respectively; and apply an optimization algorithm to the random model estimates, the random data predictions, and the random data measurements to produce the a posterioiri model estimates.

Unless otherwise indicated, all numbers expressing quantities of ingredients, properties such as molecular weight, reaction conditions, and so forth used in the present specification and associated claims are to be understood as being modified in all instances by the term "about." Accordingly, unless indicated to the contrary, the numerical parameters set forth in the following specification and attached claims are approximations that may vary depending upon the desired properties sought to be obtained by the embodiments of the present invention. At the very least, and not as an attempt to limit the application of the doctrine of equivalents to the scope of the claim, each numerical parameter should at least be construed in light of the number of reported significant digits and by applying ordinary rounding techniques.

One or more illustrative embodiments incorporating the invention embodiments disclosed herein are presented herein. Not all features of a physical implementation are described or shown in this application for the sake of clarity. It is understood that in the development of a physical embodiment incorporating the embodiments of the present invention, numerous implementation-specific decisions must be made to achieve the developer's goals, such as compliance with system-related, business-related, government-related and other constraints, which vary by implementation and from time to time. While a developer's efforts might be time-consuming, such efforts would be, nevertheless, a routine undertaking for those of ordinary skill the art and having benefit of this disclosure.

While compositions and methods are described herein in terms of "comprising" various components or steps, the compositions and methods can also "consist essentially of" or "consist of" the various components and steps.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope and spirit of the present invention. The invention illustratively disclosed herein suitably may be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces.

The invention claimed is:

1. A method comprising:
  acquiring measured data from a wellbore that penetrates a subterranean formation by a drilling system, the measured data including a wellhead pressure of the drilling system;
  executing a model that includes:
    applying a hydraulic model to an a priori model estimate vector to produce predicted data;
    converting the measured data to a measured data vector;
    applying a randomized maximum likelihood algorithm to the a priori model estimate vector, the predicted data, and the measured data vector to produce an a posterioiri model estimates; and
    applying the hydraulic model to the a posterioiri model estimates to produce an a posterioiri prediction and a calculated wellhead pressure set point that corresponds to a desired bottomhole pressure; and
  changing a wellhead pressure set point based on the calculated wellhead pressure set point.

2. The method of claim 1, wherein applying the randomized maximum likelihood algorithm to the a priori model estimate vector, the predicted data, and the measured data vector to produce the a posterioiri model estimates involves:
applying a stochastic algorithm to the a priori model estimate vector, the predicted data, and the measured data vector to produce random model estimates, random data predictions, and random data measurements, respectively;
applying an optimization algorithm to the random model estimates, the random data predictions, and the random data measurements to produce the a posterioiri model estimates.

3. The method of claim 1, wherein the measured data further comprises one selected from the group consisting of: a pressure of the drilling fluid downstream of a wellhead of the drilling system and upstream of a choke manifold of the drilling system, a pressure of the drilling fluid downstream of the choke manifold and upstream of a separator of the drilling system, a pressure of the drilling fluid downstream of a pump of the drilling system and upstream of the wellhead, a pressure of the drilling fluid in the wellbore, a temperature of the drilling fluid at the wellhead, a temperature of the drilling fluid downstream of the wellhead and upstream of the choke manifold, a temperature of the drilling fluid downstream of the choke manifold and upstream of the separator, a temperature of the drilling fluid downstream of the pump and upstream of the wellhead, a temperature of the drilling fluid in the wellbore, a flow rate of the drilling fluid at the wellhead, a two-phase flow rate of the drilling fluid downstream of the wellhead and upstream of the choke manifold, a two-phase flow rate of the drilling fluid downstream of the choke manifold and upstream of the separator, a flow rate of the drilling fluid downstream of the pump and upstream of the wellhead, a flow rate of the drilling fluid in the wellbore, and any combination thereof.

4. The method of claim 1 further comprising:
deriving the a priori model estimates vector with offset data as at least one input.

5. The method of claim 1 further comprising:
converting the a posteriori prediction to feed data; and
deriving the a priori model estimates vector with the feed data as at least one input.

6. The method of claim 1 further comprising:
running a drilling simulation to produce the a priori model estimates vector.

7. The method of claim 1 further comprising:
running a drilling simulation with offset data as at least one input to produce the a priori model estimates vector.

8. A drilling system comprising:
a wellhead operably coupled to a drill string extending into a wellbore;
a drill bit attached to the distal end of the drill string;
a pump operably connected to the drill string for circulating the drilling fluid through the drill string to an annulus defined by the drill string and the wellbore to the wellhead and a choke manifold;
a pressure sensor at the wellhead to measure a wellhead pressure;
a first control system that includes a first non-transitory, tangible, computer-readable storage medium: containing a first program of instructions that cause a first computer system running the first program of instructions to:
receive measured data from the pressure sensor;
receive or store an a priori model estimates vector;
apply a hydraulic model to the a priori model estimate vector to produce predicted data;
convert the measured data to a measured data vector;
apply a randomized maximum likelihood algorithm to the a priori model estimate vector, the predicted data, and the measured data vector to produce an a posterioiri model estimates; and
apply the hydraulic model to the a posterioiri model estimates to produce a calculated wellhead pressure set point; and
a second control system communicably coupled to the first control system to receive the calculated wellhead pressure set point and that includes a second non-transitory, tangible, computer-readable storage medium: containing a second program of instructions that cause a second computer system running the second program of instructions to:
manipulate the choke manifold based on the calculated wellhead pressure set point.

9. The drilling system of claim 8, wherein apply a randomized maximum likelihood algorithm to the a priori model estimate vector, the predicted data, and the measured data vector to produce an a posterioiri model estimates causes the first computer system running the first program of instructions to:
apply a stochastic algorithm to the a priori model estimate vector, the predicted data, and the measured data vector to produce random model estimates, random data predictions, and random data measurements, respectively; and
apply an optimization algorithm to the random model estimates, the random data predictions, and the random data measurements to produce the a posterioiri model estimates.

10. The drilling system of claim 8 further comprising:
a separator downstream of the choke manifold; and
at least one sensor configured and located to measure at least one selected from the group consisting of: a pressure of the drilling fluid downstream of the wellhead and upstream of the choke manifold, a pressure of the drilling fluid downstream of the choke manifold and upstream of the separator, a pressure of the drilling fluid downstream of the pump and upstream of the wellhead, a pressure of the drilling fluid in the wellbore, a temperature of the drilling fluid at the wellhead, a temperature of the drilling fluid downstream of the wellhead and upstream of the choke manifold, a temperature of the drilling fluid downstream of the choke manifold and upstream of the separator, a temperature of the drilling fluid downstream of the pump and upstream of the wellhead, a temperature of the drilling fluid in the wellbore, a flow rate of the drilling fluid at the wellhead, a flow rate of the drilling fluid downstream of the wellhead and upstream of the choke manifold, a flow rate of the drilling fluid downstream of the choke manifold and upstream of the separator, a flow rate of the drilling fluid downstream of the pump and upstream of the wellhead, a flow rate of the drilling fluid in the wellbore, and any combination thereof.

11. A non-transitory, tangible, computer-readable storage medium: containing a program of instructions that cause a computer system running the program of instructions to:
receive measured data from a plurality of sensors coupled to a drilling assembly, the sensors configured to measure one selected from the group consisting of a pressure, a temperature, a drilling fluid flow rate, and a combination thereof;

receive or store an a priori model estimates vector;
apply a hydraulic model to the a priori model estimate vector to produce predicted data;
convert the measured data to a measured data vector;
apply a randomized maximum likelihood algorithm to the a priori model estimate vector, the predicted data, and the measured data vector to produce an a posterioiri model estimates; and
apply the hydraulic model to the a posterioiri model estimates to produce a calculated wellhead pressure set point.

12. The medium of claim 11, wherein apply a randomized maximum likelihood algorithm to the a priori model estimate vector, the predicted data, and the measured data vector to produce an a posterioiri model estimates causes the computer system running the program of instructions to:
apply a stochastic algorithm to the a priori model estimate vector, the predicted data, and the measured data vector to produce random model estimates, random data predictions, and random data measurements, respectively; and
apply an optimization algorithm to the random model estimates, the random data predictions, and the random data measurements to produce the a posterioiri model estimates.

* * * * *